Jan. 5, 1954    J. R. BATES    2,665,246
ELECTROSTATIC SLUDGE PRECIPITATION
Filed March 10, 1950
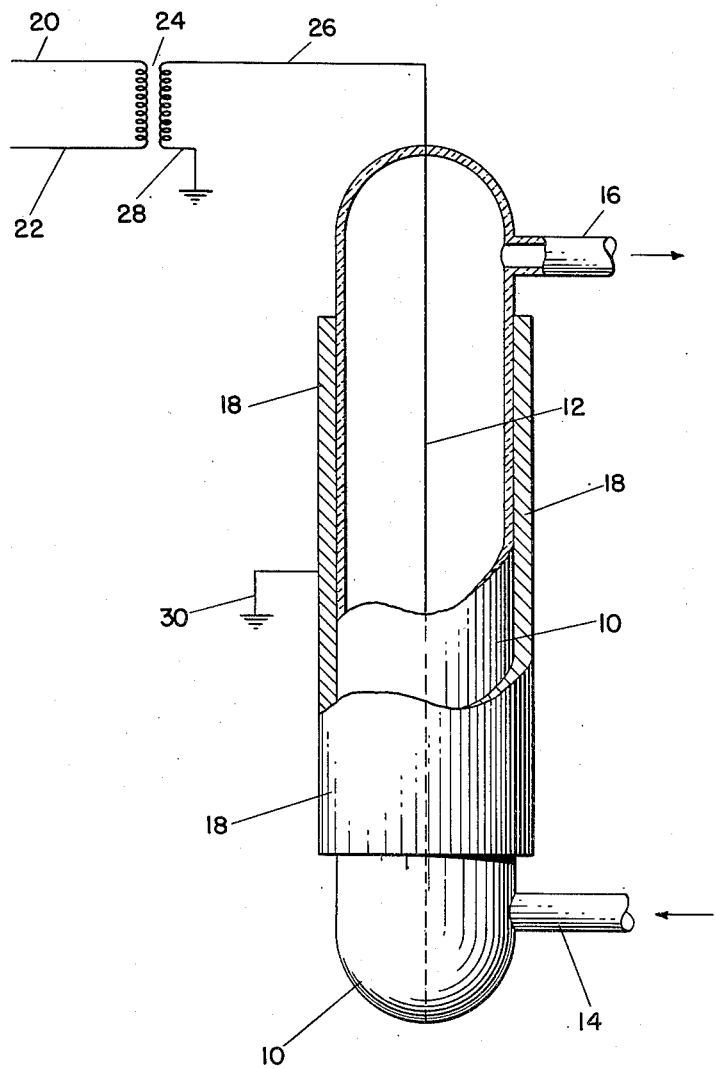
INVENTOR.
JOHN R. BATES
BY
*Busser and Harding*
ATTORNEYS Patented Jan. 5, 1954

2,665,246

UNITED STATES PATENT OFFICE 2,665,246

ELECTROSTATIC SLUDGE PRECIPITATION

John R. Bates, Swarthmore, Pa., assignor to Sun Oil Company, Philadelphia, Pa., a corporation of New Jersey Application March 10, 1950, Serial No. 148,940

6 Claims. (Cl. 204—184)

This invention relates to the removal of suspended solid material from liquids, and more specifically to the separation of sludge formed by the action of $BF_3$ on hydrocarbons from the resulting mixture of sludge and hydrocarbons.

The treatment of hydrocarbon fractions with $BF_3$ in order to improve certain properties, such as color and stability, is well known. Fractions such as naphthas, lubricating oils, cycle gas oils and gasolines have been treated with $BF_3$ for various purposes. Under such treatment, a sludge is formed in the liquid hydrocarbon, usually as finely divided suspended particles, and must be removed to make the product commercially acceptable. The removal of this sludge by accepted methods of separation, such as by filtering or centrifuging, is time consuming and costly. This is especially true where relatively small amounts of sludge are formed, since a large volume of liquid must be processed to remove the small amount of sludge.

It is therefore an object of this invention to provide a method for the refining of hydrocarbons by $BF_3$ treatment thereof. A further object is to provide a rapid and economical method for the separation of a $BF_3$ formed sludge from hydrocarbon fractions. Other objects appear hereinafter.

Electricity has been employed in hydrocarbon processes, for example, in processes for converting hydrocarbons under cracking conditions, and for the removal of solid metallic particles dispersed in liquid hydrocarbons. However, the use of electricity has not heretofore been employed for the separation of sludge formed in hydrocarbons by the action of acid-type or Friedel-Crafts catalysts.

It is a further object of this invention to provide a method for electrically removing $BF_3$ formed sludge from hydrocarbons.

It has now been found that when hydrocarbons are treated with $BF_3$ to form a sludge, and the resulting mixture of hydrocarbons and $BF_3$ formed sludge is subjected to the influence of an electrostatic field, as hereinafter described, the sludge is rapidly and effectively separated from the hydrocarbons.

The present process may be employed with crude petroleums, such as Webster Crude, and with hydrocarbon fractions containing less than about 0.1% olefins, such as straight run fractions and thermally or catalytically cracked fractions from which the olefins have been removed prior to the $BF_3$ treatment. As illustrative of such fractions which may be treated in the present process are gasoline, kerosene, fuel oil and lubricating oil fractions. Single hydrocarbons such as isooctane, n-heptane, n-decane, and the isomers and homologs thereof may also be employed. Reference to $BF_3$ sludge in this specification means the sludge formed by $BF_3$ treatment of petroleum crudes, hydrocarbons, and hydrocarbon fractions, unless otherwise defined.

To illustrate the process of the present invention a hydrocarbon fraction containing $BF_3$ sludge is subjected to the effect of an electrostatic field. This may be accomplished by batch or continuous operation. In a preferred embodiment of the process the field is created by alternating current having a potential gradient of the order at least of 5000 volts per centimeter between a conductor of small cross section oriented within a conductor of comparatively large cross section. It has been found that the $BF_3$ sludge responds to the effect of the potential gradient and deposits on the conductors. By the term "gradient," modified by either "potential" or "voltage," is meant the voltage drop per centimeter of path parallel to the field within the apparatus bounding the electrostatic field to which the hydrocarbon or fraction is subjected.

Sludges formed in hydrocarbons with acid-type or Friedel-Crafts catalysts, other than $BF_3$, such as sulfuric acid and hydrogen fluoride, are not removed in accordance with the present process, and hence are not considered within the scope of the present invention.

The drawing illustrates, diagrammatically, one form of apparatus which creates such a field effective to remove $BF_3$ sludge during the passage of a $BF_3$ treated oil, used here as illustrative, therethrough. Tube 10 is made of a non-conducting material in which conductor 12, such as a wire or rod, is centered and sealed at both ends. An inlet 14 and an outlet 16 permit the oil contaminated with $BF_3$ sludge to circulate within the electrostatic field through the tube 10. The tube 10 is enclosed in a conductor 18 of substantial area, shown here in section for clarity, which is instrumental in creating a convergent field about the conductor 12 necessary to the removal of the $BF_3$ sludge in this apparatus.

Conductors 20 and 22 connect one side of the transformer 24 to a source of alternating current not shown. The other side or secondary coil of the transformer 24 is connected by conductor 26 to the rod or wire 12 and by lead 28 to ground. The conductor 18 is also connected to ground by the lead 30. An electrostatic field is created within the tube 10 which is of high voltage and has negligible flow of current. Under such conditions the necessary electrical gradient for the removal of the finely divided $BF_3$ sludge is maintained. Various changes were made in the apparatus to modify the form of the electrostatic field which led to the preferred form shown here.

As shown in the drawing, the surface area of the center conductor is small as compared to the surface area of the enclosing conductor so that the impressed potential creates a converging field wherein the voltage gradient is highest about the center conductor. The best results are obtained where the impressed potential causes a gradient of the order of 5,000 volts per centimeter, or higher, between the center and outside conductors. Under these conditions, nearly all of the sludge precipitates on the center conductor. In some instances it has been found that the tube 10 may pass sufficient displacement current to maintain the required field at the center conductor so that the conductor 18 is not required. Tube 10 may also be constructed of conducting material with center conductor 12 insulated therefrom.

To illustrate the present process using the above described apparatus, a hydrocarbon fraction containing suspended $BF_3$ sludge is introduced into the inlet and passes upward through the convergent electric field. Under the influence of this field, the sludge becomes attached to and remains on the center conductor. A minor portion of the sludge may become attached to and remain on the wall of the tube. The effluent oil is substantially completely free of sludge and has the desired characteristics derived from the $BF_3$ treatment. When sludge is observed in the effluent oil, the process is discontinued, the apparatus drained and deposited sludge removed therefrom. Sludge removal may be accomplished by passing a solvent, such as acetone, through the apparatus, or by mechanical means, such as by scraping.

As above-described, the treatment of hydrocarbon fractions with $BF_3$ to obtain various results is known. Such treatment may be by bubbling $BF_3$ through the fraction at atmospheric pressure, or by treatment under pressure. The temperature of this treatment may be varied and good results obtained. In some treatments relatively large particles of sludge are formed, which can be separated by decantation. However, there is invariably formed a substantial quantity of finely divided sludge which does not settle and must be removed by other means.

A preferred embodiment of the present invention is the treatment of crude petroleum, preferably after any water therein has been substantially removed. Crude petroleum contains only negligible amounts of olefins, and hence further treatment prior to $BF_3$ treatment is unnecessary. This embodiment is especially valuable, since non-hydrocarbons, such as sulfur and oxygen compounds, are removed, thereby simplifying subsequent processing and reducing corrosion to metallic equipment.

The present process may also be employed to refine normally gaseous hydrocarbons, such as propane, by treating with $BF_3$ and subjecting the liquefied mixture of sludge and hydrocarbon to an electrostatic field, the pressure in the apparatus being maintained sufficient to keep the hydrocarbon in the liquid phase. Normally solid hydrocarbons may also be treated by maintaining the temperature sufficiently high to keep the hydrocarbon in the liquid phase.

The temperature of the sludge-containing hydrocarbon or hydrocarbon fraction when subjected to the electrostatic field is important, and varies according to the hydrocarbon or fraction employed. When a hydrocarbon fraction of the lubricating oil range is being treated the preferred temperature will vary somewhat depending upon whether the oil is light or heavy. It should not substantially exceed 60° C. and may be, in the case of light lubricating oils, as low as about 0° C. Preferably, with lubricating oils, the temperature should be between about 15° C. and 35° C. For lower boiling fractions lower temperatures are required, and for higher boiling fractions higher temperatures are required, the optimum range in each instance being readily determinable by test.

The following examples illustrate the process of the present invention, which is not to be considered as limited thereby:

*Example I*

Boron fluoride was bubbled at atmospheric pressure and a temperature of from about 60° C. to 65° C. through a refined lubricating oil having an average molecular weight of 359, a refractive index $n_D^{20}=1.5151$, and a viscosity at 100° F. of 524.4 Saybolt units. A dark colored, finely divided sludge was formed which exhibited only a slight tendency to settle on standing. This sludge-containing oil was subjected to the effect of an electrostatic field in an apparatus as above described. This apparatus was constructed from a glass tube having a 0.005 inch diameter tungsten wire centered therethrough and sealed into the top and bottom of the tube.

The temperature of the oil during sludge removal was about 27° C., and residence time was about 1 minute. A voltage gradient of 80,000 volts per centimeter was employed. The effluent oil was completely free of sludge. On completion of the run, it was found that a major portion of the sludge had deposited upon the wire, and a small amount on the walls.

The process was repeated except that no potential was applied. Under these conditions no sludge was removed.

*Example II*

The procedure using the same materials of Example I was substantially duplicated, except that the temperature of the oil during sludge removal was maintained at 100° C. No appreciable removal of sludge was observed.

Repeating the process at a temperature of from 50° C. to 60° C. a substantial amount of sludge removal was observed, a slight amount remaining in the effluent oil.

Repeating the process at a temperature of 0° C. no sludge removal from the oil was observed.

*Example III*

The procedure of Example I was followed, except that the sludge was formed by treating the oil with 96% sulfuric acid. After separation of the acid phase, the sludge-containing oil was charged to the apparatus. No removal of sludge was obtained.

*Example IV*

Example III was repeated except the oil was treated with hydrogen fluoride. As in Example III, no removal of sludge was obtained.

When other hydrocarbon fractions, as above described, are employed in place of the lubricating oil of the examples, substantially identical results are obtained.

Various modifications in the apparatus and process may be made without deleteriously affecting the results. For example, a direct current may be used provided both electrodes are in contact with the oil.

I claim:

1. Method of treating hydrocarbons containing deleterious materials precipitable by contact with $BF_3$ which comprises contacting hydrocarbons containing said deleterious materials with $BF_3$ as the sole treating agent to form a finely divided sludge containing said deleterious materials, and subjecting said hydrocarbons admixed with the $BF_3$ formed sludge in the liquid phase at a sludge-removing temperature of from 0° C. to 60° C. to contact with an electrode providing a convergent electrostatic field having a potential gradient of at least 5,000 volts per centimeter whereby the $BF_3$ formed sludge deposits on said electrode, and recovering hydrocarbons free from the $BF_3$ formed sludge.

2. Method according to claim 1 wherein said hydrocarbons containing deleterious materials precipitable by contact with $BF_3$ constitute a gasoline fraction.

3. Method according to claim 1 wherein said hydrocarbons containing deleterious materials precipitable by contact with $BF_3$ constitute a kerosene fraction.

4. Method according to claim 1 wherein said hydrocarbons containing deleterious materials precipitable by contact with $BF_3$ constitute a cycle gas oil fraction.

5. Method according to claim 1 wherein said hydrocarbons containing deleterious materials precipitable by contact with $BF_3$ constitute a lubricating oil fraction.

6. Method according to claim 1 wherein said hydrocarbons containing deleterious materials precipitable by contact with $BF_3$ constitute crude petroleum.

JOHN R. BATES.

References Cited in the file of this patent

UNITED STATES PATENTS

| Number | Name | Date |
|---|---|---|
| 1,170,184 | Peek | Feb. 1, 1916 |
| 1,533,711 | Stevens | Apr. 14, 1925 |
| 1,931,725 | Girvin | Oct. 24, 1933 |
| 2,261,108 | Dillon et al. | Nov. 4, 1941 |